United States Patent
Choo et al.

(10) Patent No.: US 11,821,556 B2
(45) Date of Patent: Nov. 21, 2023

(54) QUICK CONNECTOR

(71) Applicant: Hanil Tube Corporation, Incheon (KR)

(72) Inventors: Seong-Hwa Choo, Icheon (KR); Jeong-Ho Lim, Incheon (KR)

(73) Assignee: HANIL TUBE CORPORATION, Incheon (KR)

( * ) Notice: Subject to any disclaimer, the term of this patent is extended or adjusted under 35 U.S.C. 154(b) by 414 days.

(21) Appl. No.: 17/058,027

(22) PCT Filed: May 31, 2018

(86) PCT No.: PCT/IB2018/053907
§ 371 (c)(1),
(2) Date: Nov. 23, 2020

(87) PCT Pub. No.: WO2019/229502
PCT Pub. Date: Dec. 5, 2019

(65) Prior Publication Data
US 2021/0199222 A1  Jul. 1, 2021

(51) Int. Cl.
*F16L 37/14* (2006.01)
*F16L 37/133* (2006.01)

(52) U.S. Cl.
CPC ............ *F16L 37/144* (2013.01); *F16L 37/133* (2013.01); *F16L 2201/10* (2013.01)

(58) Field of Classification Search
CPC ..... F16L 37/12; F16L 37/1225; F16L 37/133; F16L 37/144; F16L 37/0847;
(Continued)

(56) References Cited

U.S. PATENT DOCUMENTS

| 5,863,077 A | 1/1999 | Szabo et al. |
| 10,422,459 B2 | 9/2019 | Jones et al. |

(Continued)

FOREIGN PATENT DOCUMENTS

| CN | 101825204 A | 9/2010 |
| CN | 104024716 A | 9/2014 |

(Continued)

OTHER PUBLICATIONS

English translation of "The First Office Action" of Chinese Patent Application No. 201880093984.9, dated Nov. 1, 2021, 7 pages.
(Continued)

*Primary Examiner* — Aaron M Dunwoody
(74) *Attorney, Agent, or Firm* — DICKINSON WRIGHT PLLC (57) ABSTRACT

A quick connector assembly for making a severable connection in a fluid line includes a connector body and a lock cover. The connector body has a through bore along a longitudinal axis and further includes a retainer that is engaged with the connector body for securing a male member and a bead checker that is sized and position to be laterally moved outwardly from the longitudinal axis. The lock cover releasably engages with the connector body and includes a verifier for verifying whether the male member is fully inserted into the connector body. Accordingly, the quick connector assembly is securely coupled with the male member having an annular bead as a quick connector coupling.

17 Claims, 8 Drawing Sheets

(58) Field of Classification Search
CPC . F16L 37/0841; F16L 37/098; F16L 37/0985; F16L 2201/10
See application file for complete search history.

(56) References Cited

U.S. PATENT DOCUMENTS

| | | |
|---|---|---|
| 2004/0036283 A1 | 2/2004 | Furuya |
| 2006/0267341 A1 | 11/2006 | Takayanagi |
| 2007/0180608 A1 | 8/2007 | Zhadanov et al. |
| 2009/0261582 A1 | 10/2009 | Gaudin |
| 2010/0032937 A1 | 2/2010 | Kerin et al. |
| 2010/0219629 A1 | 9/2010 | Kerlin et al. |
| 2014/0339821 A1 | 11/2014 | Ishizaka et al. |
| 2016/0069496 A1* | 3/2016 | Tayama .............. F16L 37/1225 285/374 |
| 2016/0201835 A1 | 7/2016 | Jones et al. |
| 2017/0067588 A1 | 3/2017 | Chaupin et al. |
| 2018/0119859 A1 | 5/2018 | Lee et al. |

FOREIGN PATENT DOCUMENTS

| | | |
|---|---|---|
| CN | 105090641 A | 11/2015 |
| CN | 105782616 A | 7/2016 |
| JP | 2004251319 | 9/2004 |
| JP | 2006-316944 A | 11/2006 |
| JP | 2011-094668 | 5/2011 |
| JP | 2013-032807 A | 2/2013 |
| JP | 2013-151991 A | 8/2013 |
| KR | 20120049656 A | 5/2012 |

OTHER PUBLICATIONS

English translation of "Notification of Reasons For Rejection" of Japanese Patent Application No. 2020-566572, dated Feb. 1, 2022, 4 pages.

* cited by examiner

QUICK CONNECTOR

RELATED APPLICATIONS

The present patent document claims priority to PCT Application PCT/IB2018/053907, filed May 31, 2018, the entire contents of which are incorporated herein by reference.

FIELD

The present disclosure relates to a quick connector coupling for making a releasable connection in a fluid line assembly.

BACKGROUND

The statements in this section merely provide background information related to the present disclosure and may not constitute prior art. Quick connectors are basically known devices in the automotive and other fields. The quick connector couplings generally include a pipe or tube received and sealingly retained in a connector body of the quick connector. The quick connector couplings are used to provide a fluid connection between two components or conduits, thus establishing a fluid line between the two components.

We have found that a simplified quick connector with a specific and high reliability type can be coupled in a sealed and secured fluid line with a minimum amount of time and expense in an assembly process. Such a quick connector couplings are very useful, for example, in the fluid line systems of internal combustion engines, in particular of vehicles. Furthermore, the reliable and secure quick connector couplings can be used in a brake line system, the fuel line system and other conduit systems.

SUMMARY

The present disclosure relates to a quick connector coupling for making a severable connection in a fluid line. A quick connector is coupled with a male member (such as a tube or pipe) having an annular bead. The quick connector includes a connector body defining a through bore extended from a male member reception end to a tube connection end along a longitudinal axis. The through bore is sized to receive the male member generally having a tubular shape. The male member is sized to extend into the male member reception end and has the annular bead. The annular bead has a diameter greater than a diameter of a tubular outer surface of the male member. The connector body further includes a bead checker that is sized and position to be laterally moved outwardly from the longitudinal axis by the annular bead of the male member. The quick connector further includes a lock cover releasably securing the male member within the connector body and including a verifier. The lock cover moves between a latched position and an unlatched position. The verifier has a verifier body that extended from an internal surface of the lock cover and allows the lock cover to move to the latched position only if the verifier body is not contacted to the bead checker of the connector body or the annular bead of the male member.

According to one aspect of the present disclosure, the bead checker includes a pair of generally parallel fingers extended from the connector body towards the male member reception end. The fingers are configured for blocking the verifier body of the lock cover from moving to the latched position of the lock cover when the lock cover is coupled with the connector body without installing the male member. In addition, the fingers are biased towards a blocking position, and in an assembled configuration with the male member, the fingers are resiliently pushed away from the longitudinal axis of the through bore by the annular bead of the male member secured in the connector body for allowing the verifier body of the lock cover to move to the latched position. In this way, the bead checker is integrated into the connector body so that it cannot be removed or lost.

The connector body engages with a retainer for securing the male member to the connector body in the assembled configuration. The retainer has a pair of retainer tabs, and each of the retainer tabs comprises an angled guide surface that is configured for allowing the retainer tabs to be resiliently pushed away from the longitudinal axis of the through bore by contacting with the annular bead of the male member when the male member is inserted into the through bore of the connector body in the assembled configuration.

The lock cover further includes an upper side, opposing lateral sides, a male member reception end side and an opening side. The upper side and the lateral sides are parallel to the longitudinal axis, and the male member reception end side and the opening side are perpendicular to the longitudinal axis. The opening side of the lock cover is faced to the male member reception end side. The verifier body of the lock cover includes at least a leg that is transversely extended from an internal surface of the upper side and is unitarily formed as a single piece on the male member reception end side.

According to another aspect of the present disclosure, the verifier body of the lock cover includes at least a beam member that is transversely extended from an internal surface of the male member end side towards the through bore along the longitudinal axis. In this way, the verifier is also integrated into the quick connector so that it remains attached thereto and cannot be removed or lost.

According to another aspect of the present disclosure, the lock cover further includes at least a sound checker that is transversely extended from the internal surface of the male member reception end side towards the through bore along the longitudinal axis, and is configured to make a click sound only if the lock cover moves to the latched position. The connector body further includes at least a slot that is configured for receiving the sound checker of the lock cover and has a protruded dart for allowing the sound checker of the lock cover to make the click sound only if the lock cover moves to the latched position.

The verifier of the lock cover is placed between the bead checker and the tubular outside surface of the male member in the latched position of the lock cover. The male member reception end side of the lock cover has a first generally circular opening and a second generally circular opening. A diametric size of the first circular opening is larger than a diameter of the annular bead of the male member for allowing the annular bead of the male member to axially move into the connector body in the unlatched position of the lock cover along the longitudinal axis and a diametric size of the second circular opening is smaller than the annular bead of the male member for preventing the retained male member from being pulled-off in the latched position of the lock cover. The lock cover is made of a plastic material.

According to another aspect of the present disclosure, a quick connector to be coupled together with a tubular male member which is provided with an annular bead for making a severable connection in a fluid line includes a connector body and a lock cover. The connector body defines a through bore and a longitudinal axis. The connector body further includes a retainer, which engages with the connector body and the retainer is configured to secure the annular bead of the male member when the male member is inserted into the through bore of the connector body. In addition, the connector body includes a pair of bead checkers, which are extended from the connector body. The bead checkers are operable between a blocking position and a non-blocking position and the annular bead of the male member moves the bead checkers away from the longitudinal axis during transition from the blocking position to the non-blocking position. The bead checkers are biased towards the blocking position. The annular bead of the male member is secured into the connector body by the retainer. The lock cover releasably couples with the connector body in an unlatched position and moves between the unlatched position and a latched position. A verifier is integrally formed with the lock cover and the verifier has a verifier body transversely extended from an internal surface of the lock cover for allowing the lock cover to move to the latched position only if the verifier body is not contacted to the bead checkers of the connector body or the annular bead of the male member.

Further areas of applicability will become apparent from the description provided herein. Everyone should understand that the description and specific examples presented herein are for the purpose of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, a quick connector coupling of the present disclosure is illustrated in connection with a fluid line assembly. It is shown as a releasable connection between a rigid tube and other fluid carrying components, particularly a flexible hose. However, the quick connector coupling have numerous other applications where a fluid tight, but releasable connection is desired, such as connection of rigid elements of a fluid path, whether pressurized or unpressurized in an automotive vehicle.

Figure 1A:
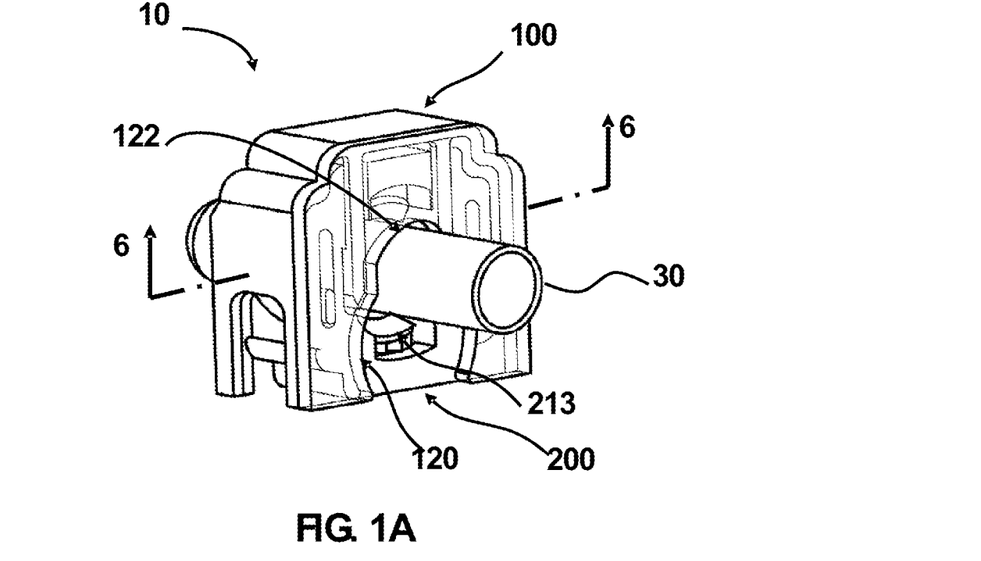
FIG. 1A is a perspective view of a quick connector coupling and FIG. 1B is a perspective view of a process of a quick connector assembly coupling with a male member in accordance with the present disclosure.
Figure 1B:
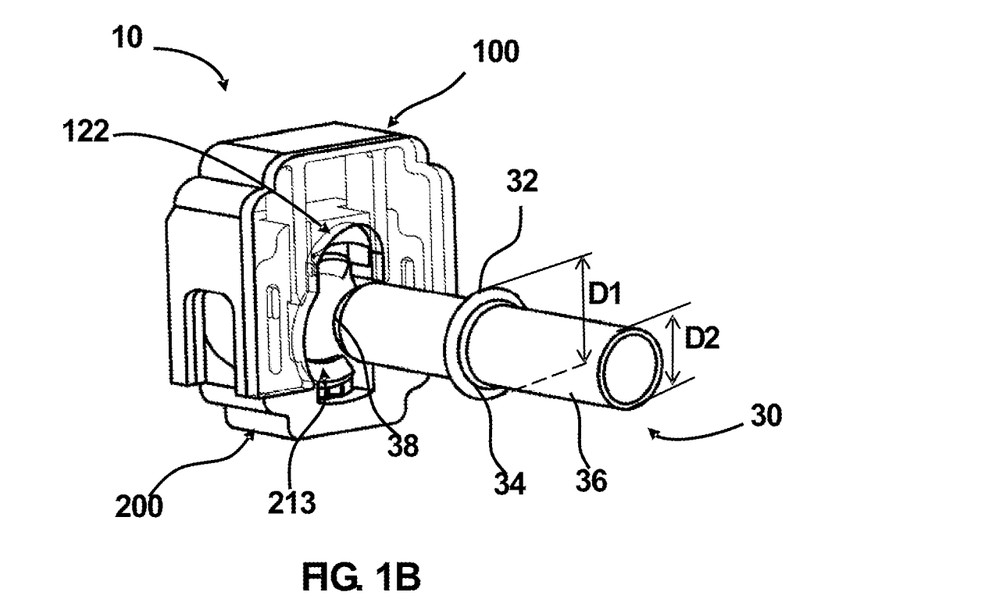

Referring in more detail to the drawings, FIGS. 1A and 1B illustrate a quick connector coupling 10 for forming a severable connection in a fluid line. The quick connector coupling 10 is comprised of a connector body 200 including a retainer 213 and a male member 30. Mainly, the retainer 213 of the connector body 200 releasably secures the male member 30. The quick connector coupling 10 further comprises a lock cover 100 that additionally secures the coupling of the connector body 200 with the male member 30 by increasing a pull-off force in the quick connector coupling 10. The male member 30 is formed as a tubular shape which forms a part of a fluid line system. As shown in FIGS. 1A and 1B, the connector body 200 and the male member 30 are connectable to form a permanent, but severable, joint in the fluid line.

As illustrated in FIG. 1B, the male member 30 is formed at the end of a rigid tube. The male member 30 includes an annular bead 32 as a radially enlarged area at a given distance from an open tube end 38. The open tube end 38 has a rounded or tapered tip. The rounded or tapered tip on the open tube end 38 is configured for allowing the male member 30 to be easily inserted into the connector body 200. Furthermore, the annular bead 32 defines a radial contact surface 34 and a tubular outer surface 36 is defined by the exterior surface of the tube. Accordingly, as shown in FIG. 1B, a diameter D1 of the annular bead 32 is larger than a diameter D2 of the tubular outer surface 36.

Figure 2A:
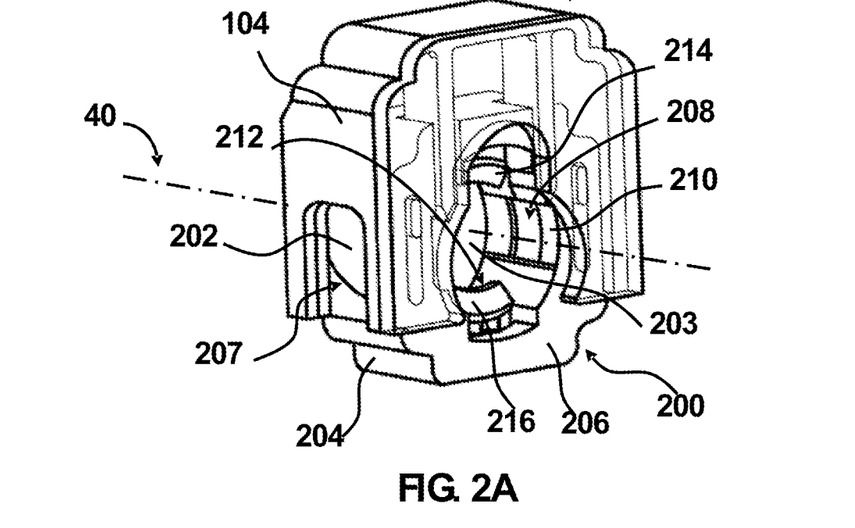
FIG. 2A shows a perspective view of the quick connector assembly in accordance with the present disclosure.
Figure 2B:
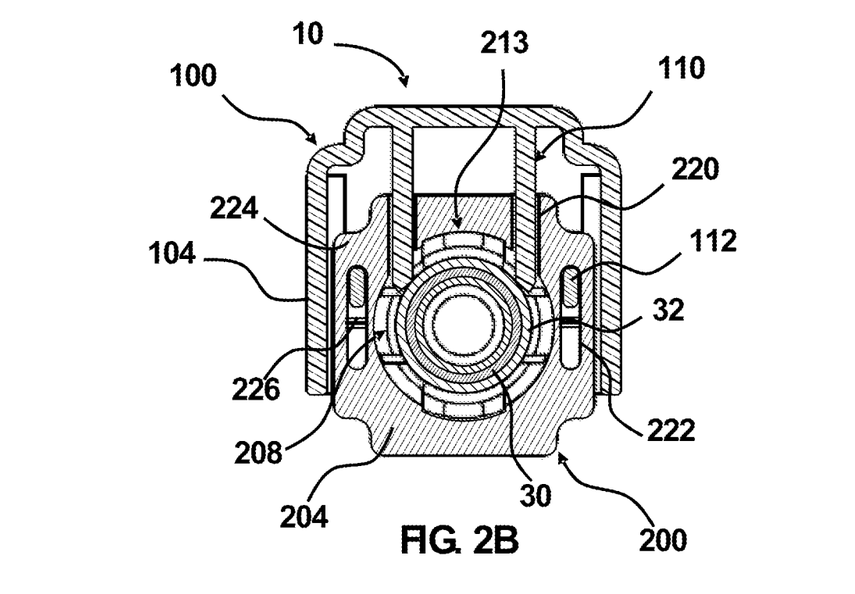
FIG. 2B shows a rearward axial view of the quick connector coupling without a male member reception end side of a lock cover in accordance with the present disclosure.

The connector body 200 is illustrated in detail in FIGS. 2A and 2B. As shown in FIGS. 2A and 2B, the connector body 200 includes a through bore 202 centered about a longitudinal axis 40. It should be noted that term axial and axially as used herein means longitudinally along the central axis 40. The term lateral, laterally, transverse and transversely mean in a plane generally perpendicular to the central axis 40 towards and away from the axis 40.

The through bore 202 of the connector body 200 extends axially through the connector body 200 forward from a housing section 204 of the connector body 200. It should be noted that the term forward is used herein to mean in a direction axially from a male member reception end 206 of the housing section 204 towards a tube connection end 207 of the through bore 202 generally along the central axis 40 (see FIG. 6). The term rearward means in a direction axially from the tube connection end 207 of the through bore 202 towards the male member reception end 206 generally along the central axis 40 (see FIG. 6). The through bore 202 has an internal receptacle surface 203 that is generally contact with the tubular outer surface 36 of the male member 30 while the male member 30 is installed to the connector body 200 and when the male member 30 is fully inserted into the connector body 200.

The connector body 200 further includes the housing section 204. The housing section 204 is coupling with the lock cover 100 for additionally securing the retained male member 30 in the connector body 200 by increasing the pull-off force in the quick connector coupling 10. The housing section 204 includes the male member reception end 206 and is generally defined by a rectangular shape, such as a square or rectangular box shape, however, other suitable shapes may be implemented in accordance with other forms of the present disclosure.

Figure 3:
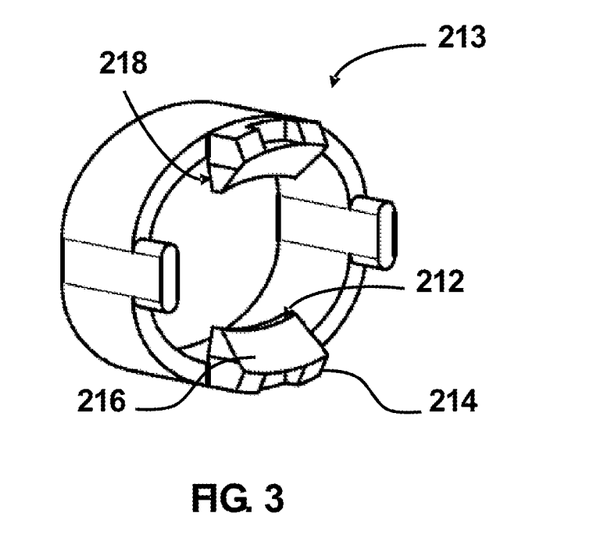
FIG. 3 shows a perspective view of a retainer in accordance with a form of the present disclosure.

As shown in FIGS. 2A and 2B, the housing section 204 of the connector body 200 includes a bead checker 208, a pair of first slots 220 and a pair of second slots 222. The housing section 204 further includes a pair of retainer tabs 214 by engaging with the retainer 213. Preferably, the retainer 213 and the connector body 200 are separate parts and assembled as a combined connector body 200. In accordance with a form of the present disclosure, as shown in FIG. 3, in a pre-assembled condition, the retainer 213 is a ring or oval shaped structure and may encircle the housing section 204. As shown in FIG. 3, the retainer 213 has the retainer tabs 214 that are facing each other.

Figure 4:
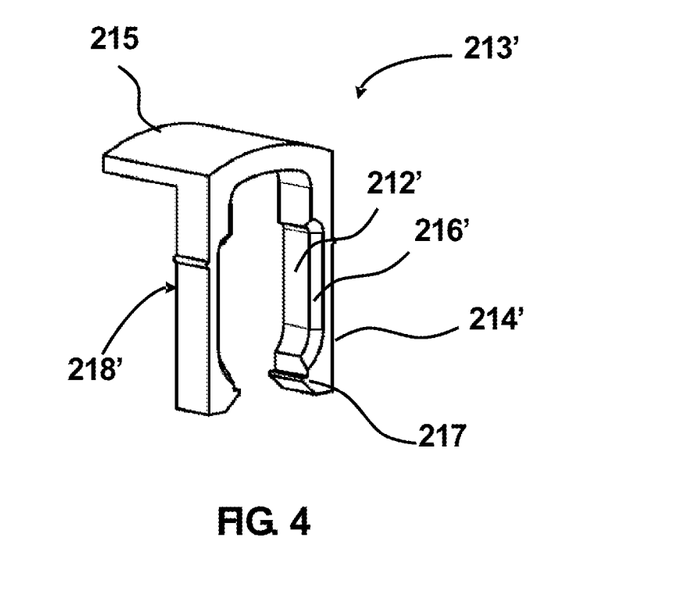
FIG. 4 shows a perspective view of a retainer in accordance with other form of the present disclosure.

In accordance with another form of the present disclosure, as shown in FIG. 4, a retainer 213' is an U-shaped or a horse-shoe type structure. The retainer 213' is transversely coupled to the housing section 204 formed as the one connector body 200. The retainer 213' includes a pair of elongated, generally parallel retainer tabs 214' extending from a connecting portion 215 of the retainer 213'. The connecting portion 215 of the retainer 213' provides a separation between the retainer tabs 214' approximately equal to the diameter D2 of the tubular outer surface 36 of the male member 30 when the retainer 213' is engaged with the housing section 204 of the connector body 200.

Figure 10:
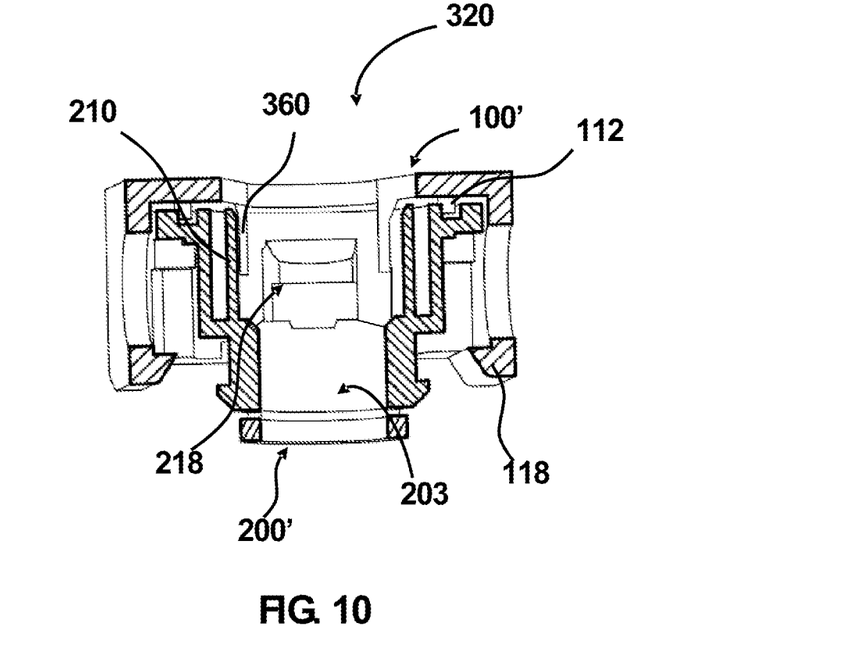
FIG. 10 shows a cross section view of the quick connector assembly of FIG. 8, taken along line 10-10 of FIG. 8.

As shown in FIGS. 3 and 10, the retainer tabs 214 of the retainer 213 each have an abutment surface 218 facing axially in forward direction along the central axis 40, by which when the male member 30 is fully inserted into the connector body 200 as an assembled configuration of the quick connector coupling 10, the connector body 200 abuts on the radial contact surface 34 of the annular bead 32 of the male member 30 (see also FIG. 1A).

As shown in FIGS. 2A and 2B, the retainer tabs 214 each have an axial contact surface 212, which is curved, and has the same curvature as the tubular outer surface 36 of the male member 30. In the assembled configuration, the axial contact surface 212 of the retainer tabs 214 rest against the tubular outer surface 36 of the male member 30. In addition, the retainer tabs 214 each have an angled guide surface 216 for allowing the male member 30 easily to insert into the connector body 200. The angled guide surface 216 is started from an outward end of the angled guide surface 216 and extended inwardly curved in the direction of the central axis 40 as shown in FIGS. 2A and 2B. In particular, the angled guide surface 216 of the retainer tabs 214 is configured for interacting with the annular bead 32 of the male member 30, and securing the male member 30.

In accordance with another form of the present disclosure, as shown in FIG. 4, the retainer tabs 214' include a latching 217 formed at an end remote from the connecting portion 215 for engaging with the housing section 204 of the connector body 200. The retainer tabs 214' include an angled guide surface 216' that interacts with the annular bead 32 of the male member 30 when the male member 30 is inserted into the connector body 200. The angled guide surface 216' of the retainer tabs 214' allows the annular bead 32 of the male member 30 to pass between the retainer tabs 214' by pushing the retainer tabs 214' laterally outward the central axis 40. As soon as the annular bead 32 of the male member 30 passes the retainer tabs 214', the retainer tabs 214' return back to the original and undeformed position of the retainer tabs 214', so that an abutment surface 218' of the retainer tabs 214' abuts on the radial contact surface 34 of the annular bead 32. Accordingly, the angled guide surface 216' and the abutment surface 218' of the retainer tabs 214' are configured for securing the male member 30 inside the through bore 202 of the connector body 200. In an assemble configuration, an axial contact surface 212' of the retainer tabs 214' rests against the tubular outer surface 36 of the male member 30.

Referring back to FIGS. 2A and 2B, the figures also illustrate the bead checker 208. The bead checker 208 includes a pair of fingers 210 rearwardly extended from the through bore 202 towards the male member reception end 206 along the central axis 40. The bead checker 208 of the connector body 200 may be generally integrally formed with the connector body 200 or assembled with the housing section 204 as one combined connector body 200 (e.g. unitarily formed as a single piece). The fingers 210 of the bead checker 208 are parallel to the central axis 40 and facing to each other, and each of the fingers 210 has a rectangular shape. However, other suitable shapes in accordance with other forms of the present disclosure may be implemented. In the assembled configuration of the quick connector coupling 10, the annular bead 32 of the male member 30 laterally pushes the fingers 210 away from the central axis 40, and thus the fingers 210 of the bead checker 208 are resiliently moved out from the central axis 40. Accordingly, the bead checker 208 is operated between a blocking position and a non-blocking position, and biased towards the blocking position. Therefore, a clearance between both fingers 210 of the bead checker 208 after the male member 30 is fully inserted into the through bore 202 of the connector body 200 (non-blocking position of the bead checker 208) is greater than the clearance between both fingers 210 of the bead checker 208 before the male member 30 is introduced to a quick connector assembly 20 (blocking position of the bead checker 208). It will also be noted by the skilled artisan that, through this construction of the connector body 200, the bead checking device cannot be removed, and hence lost, thereby increasing the security and ease of use for the operator.

According to an aspect of the present disclosure, as shown in FIGS. 2A and 2B, the housing section 204 of the connector body 200 further includes the first slots 220 on the top side of the housing section 204. The first slots 220 receive and position a verifier 110 of the lock cover 100 when the lock cover 100 initially coupled with the connector body 200 before the male member 30 is introduced to the quick connector assembly 20 as a pre-assembled configuration of the quick connector coupling 10. The first slots 220 are formed on the housing section 204 of the connector body 200 transversely to the central axis 40.

Furthermore, the second slots 222 of the housing section 204 are located on a rearward facing surface 224 of the male member reception end 206 as shown in FIGS. 2A and 2B. The second slots 222 of the connector body 200 couple with a pair of sound checkers 112 of the lock cover 100. In addition, the second slots 222 are generally formed at the location which is laterally close to opposing lateral sides 104 of the lock cover 100. In addition, the second slots 222 each have a dart 226 protruded from an internal surface on the second slots 222. The darts 226 on each of the second slots 222 are generally located at a middle area between the top and bottom of the second slots 222. The connector body 200 may be generally made of a fiber-reinforced material, preferably a thermoplastic synthetic resin (PPA or PA). However, the connector body 200 is formed by other suitable materials in accordance with other forms of the present disclosure.

Figure 5A:
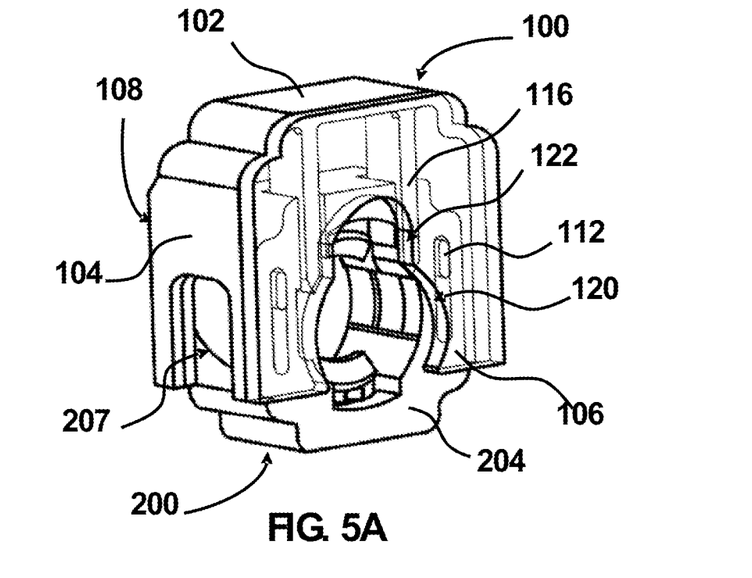
FIG. 5A shows a perspective view of the quick connector assembly in accordance with the present disclosure.
Figure 5B:
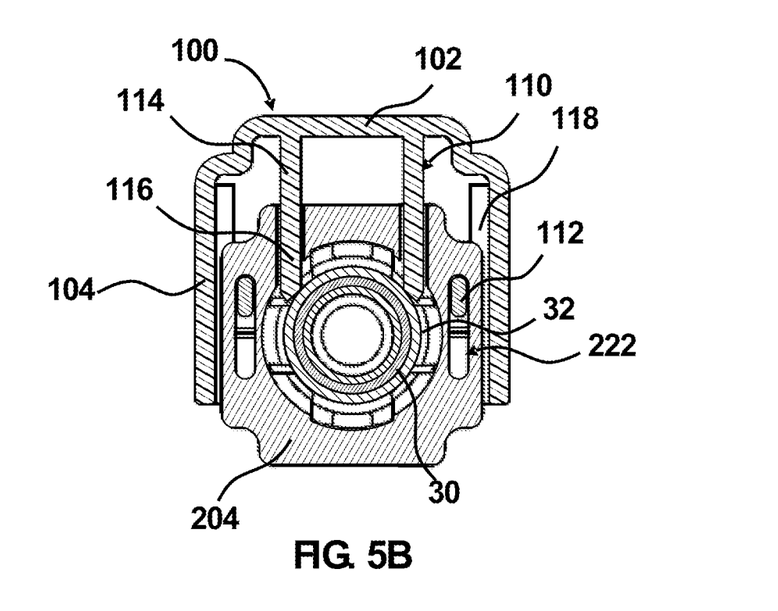
FIG. 5B shows a rearward axial view of the quick connector coupling without the male member reception end side of the lock cover in accordance with the present disclosure.

FIGS. 5A and 5B illustrate the lock cover 100 for releasably coupling with the connector body 200. According to an aspect of the present disclosure, the lock cover 100 defines by a rectangular shape according to the outer shape of the housing section 204 for allowing the lock cover 100 to releasably cover or enclose the housing section 204 of the connector body 200. However, other suitable shapes of the lock cover 100 according to other shapes of the housing section 204 in other forms of the present disclosure may be implemented.

Figure 6:
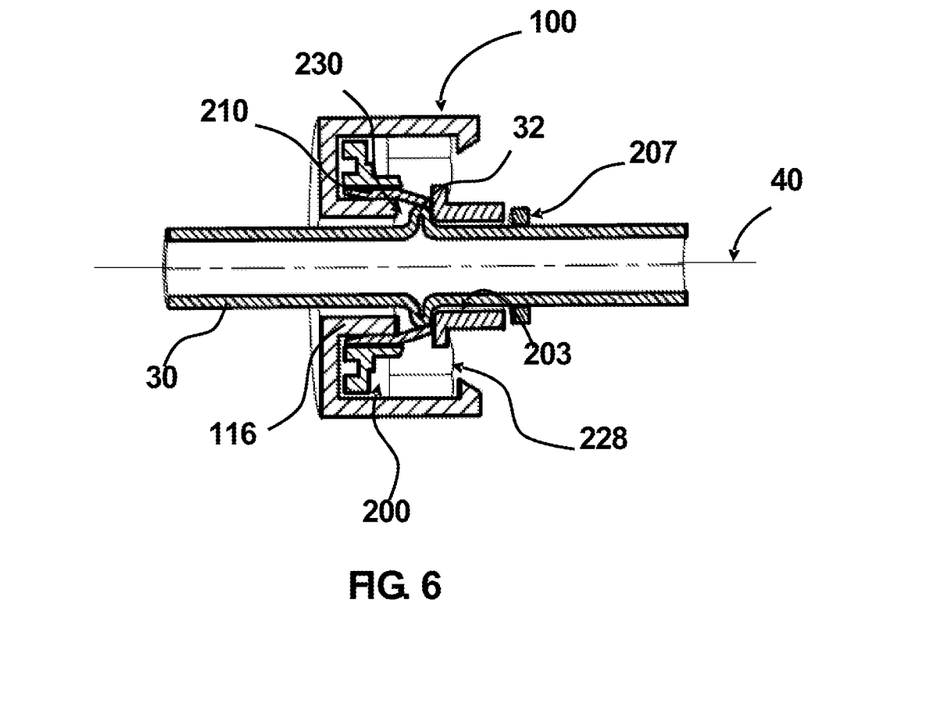
FIG. 6 shows a cross section view of the quick connector coupling of FIG. 1A, taken along line 6-6 of FIG. 1A.

As shown in FIGS. 5A and 5B, the lock cover 100 includes a top side 102, the opposing lateral sides 104, a male member reception end side 106 and an opening side 108. The opening side 108 of the lock cover 100 is forwardly located, which is close to the tube connection end 207 of the connector body 200. (See also FIG. 6). The opening side 108 includes a pair of latching edges 118 formed from the lateral sides 104. The latching edges 118 on the opening side 108 generally define L-shaped edge and releasably engage the lock cover 100 with the housing section 204 of the connector body 200. Furthermore, inner axial lengths of the top side 102 and the lateral sides 104 are slightly greater (to allow clearance) than an axial length of the housing section 204 of the connector body 200 for allowing the lock cover 100 to enclose the housing section 204 of the connector body 200 as shown in FIG. 6. It will also be noted by the skilled artisan that, through this engaging construction of the connector body 200 and the lock cover 100, the lock cover 100 including the verifier 110 cannot be removed, and hence lost, thereby increasing the security and ease of use for the operator.

According to an aspect of the present disclosure, as shown in FIGS. 5A and 5B, the lock cover 100 includes the verifier 110. The verifier 110 has a verifier body 114 including a pair of elongated, generally parallel legs 116. The legs 116 are extended transversely from the top side 102 of the lock cover 100. The rearward edge of the legs 116 faced to the male member reception end side 106 is also integrally formed with the male member reception end side 106 of the lock cover 100 (e.g. unitarily formed as a single piece). The legs 116 have an axial length approximately equal to, but slightly less (to allow clearance) than an axial length of the first slots 220 of the connector body 200. In addition, as shown in FIG. 7A, a length L of the legs 116 generally reaches to the bead checker 208 of the connector body 200 when the lock cover 100 couples with the connector body 200 in the pre-assembled configuration of the quick connector coupling 10 as a quick connector assembly 20.

In FIGS. 5A and 5B, the lock cover 100 further includes the sound checkers 112 extending axially forward from the male member reception end side 106. The sound checkers 112 of the lock cover 100 engage with the second slots 222 of the connector body 200. An axial length of the sound checkers 112 is approximately equal to, but slightly less (to allow clearance) than an axial depth of the second slots 222 of the connector body 200. In the unlatched position of the lock cover 100 as the pre-assembled configuration of the quick connector coupling 10, as shown in FIG. 7A, the sound checkers 112 of the lock cover 100 is placed inside a top portion of the second slots 222 of the connector body 200.

FIGS. 5A and 5B further illustrate the lock cover 100 having a first generally circular opening 120 and a second generally circular opening 122 on the male member reception end side 106 of the lock cover 100. The first circular opening 120 and the second circular opening 122 are coplanar and together generally define a keyhole shape as shown in FIG. 5A. A diametric size of the first circular opening 120 is greater than a diametric size of the second circular opening 122. The diametric size of the first circular opening 120 of the lock cover 100 is larger than the diameter of the annular bead 32 of the male member 30 for allowing the annular bead 32 of the male member 30 to pass through the lock cover 100 in the unlatched position of the lock cover 100. The diametric size of the second circular opening 122 of the lock cover 100 is smaller than the diameter of the annular bead 32 of the male member 30 for preventing the male member 30 from being pulled-off when the male member 30 is fully inserted into the connector body 200, and the lock cover 100 moves for locking the quick connector coupling 10 such as a latched position of the lock cover 100 as shown in FIG. 1A. The latched position of the lock cover 100 is defined as the quick connector assembly 20 is securely and releasably connected with the male member 30 when the male member 30 is secured by the retainer 213 of the connector body 200, and additionally verified by the lock cover 100.

Figure 7A:
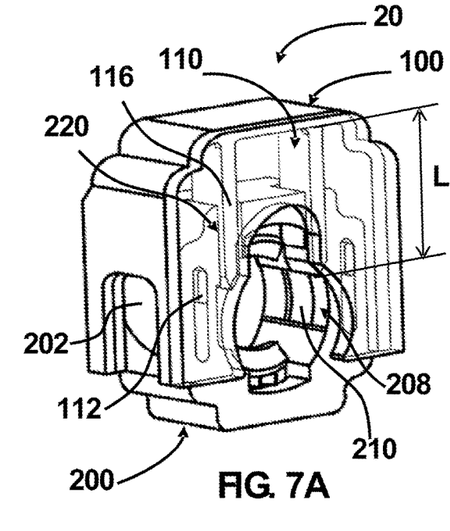
FIG. 7A shows a perspective view of the quick connector assembly without the male member.

FIGS. 7A-7D illustrate connecting steps of the quick connector assembly 20 with the male member 30. In accordance with an aspect of the present disclosure, it is necessary to pre-assemble the connector body 200 and the lock cover 100 by pushing the lock cover 100 towards the housing section 204 from the male member reception end 206 of the connector body 200 along the axial direction. As shown in FIG. 7A, such pre-assembly may be accomplished by engaging the verifier 110 and the sound checkers 112 of the lock cover 100 respectively with the first slots 220 and the second slots 222 of the connector body 200. At the same time, the latching edge 118 in the opening side 108 of the lock cover 100 is engaged with a forward facing surface 228 of the housing section 204 of the connector body 200. (See FIG. 6). Accordingly, the accomplished pre-assembly state of the quick connector coupling 10 including the lock cover 100 and the connector body 200 is defined as the unlatched position of the lock cover 100 in the quick connector assembly 20.

Figure 7B:
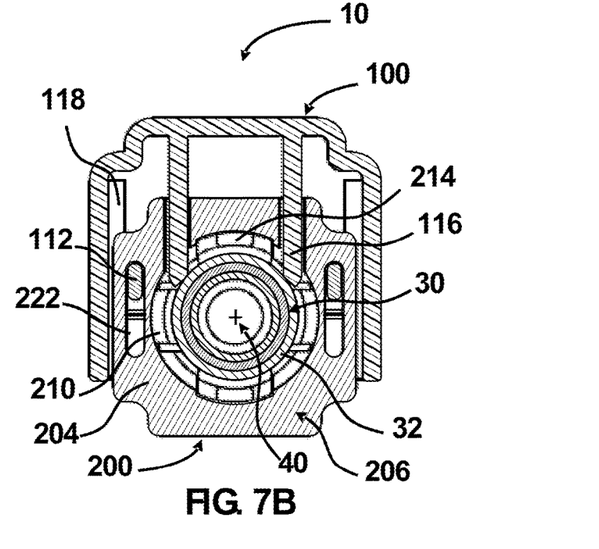
FIGS. 7B-7C shows a process of an assembly of the quick connector assembly with the male member.

As shown in FIG. 7A, in the unlatched position of the lock cover 100, the bead checker 208 of the connector body 200 prevents the lock cover 100 from moving to the latched position because the verifier 110 of the lock cover 100 is blocked by the fingers 210 of the bead checker 208. In the unlatched position of the lock cover 100, FIG. 7B shows the male member 30 is introduced into the quick connector assembly 20 such that the male member 30 is movably guided in the axial direction with respect to the central axis 40. In this way, on axial insertion of male member 30, the fingers 210 of the bead checker 208 are resiliently pushed away from the central axis 40 before engaging with the retainer tabs 214 of the connector body 200. During this process, as shown in FIG. 7B, the legs 116 of the lock cover 100 are also blocked by the annular bead 32 of the male member 30 because the annular bead 32 of the male member 30 is placed after pushing the bead checker 208 away from the central axis 40. Accordingly, this relationship prevents the lock cover 100 from moving to the latched position of the lock cover 100. This restriction of the lock cover 100 is recognized that the male member 30 is not fully and securely inserted into the quick connector assembly 20. Therefore, in this condition, the lock cover 100 cannot be moved to the latched position from the unlatched position.

Figure 7C:
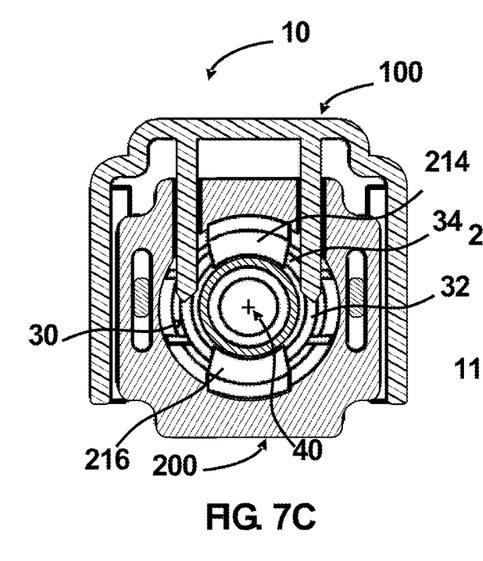

As shown in FIGS. 7A and 7C, as the male member 30 is displaced further into the through bore 202 of the connector body 200, the annular bead 32 of the male member 30 is brought into the contact with the angled guide surface 216 of the retainer tabs 214. Because of this, the retainer tabs 214 are pressed apart in radial direction with respect to the central axis 40 so that the annular bead 32 can slide between the retainer tabs 214. As soon as the annular bead 32 of the male member 30 passes the retainer tabs 214, the retainer tabs 214 return back to the original and undeformed position of the retainer tabs 214, so that the abutment surface 218 of the retainer tabs 214 abuts on the radial contact surface 34 of the annular bead 32, and secures the male member 30 inside the through bore 202 of the connector body 200. (See FIG. 6). Accordingly, the male member 30 is fully inserted into the connector body 200 as the assembled configuration of the male member 30 with the quick connector assembly 20. As shown in FIG. 7C, in the assembled configuration of the quick connector coupling 10, the lock cover 100 is still stayed in the unlatched position.

Figure 7D:
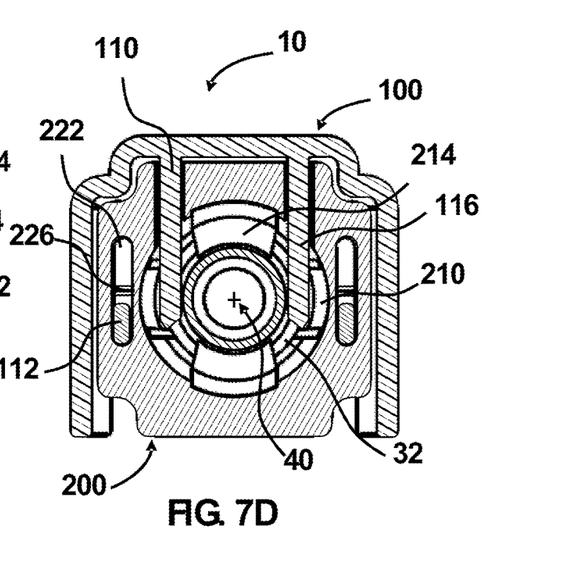
FIG. 7D shows the quick connector coupling in a latched position of a lock cover in accordance with the present disclosure.

FIG. 7D illustrates the fully and securely connected quick connector coupling 10 by moving the lock cover 100 to the latched position. Once the annular bead 32 of the male member 30 has passed the retainer tabs 214, the annular bead 32 keeps pushing the fingers 210 of the bead checker 208 laterally out from the central axis 40, and make a space 230 between the tubular outer surface 36 of the inserted male member 30 and the laterally-pushed fingers 210 of the bead checker 208 inside the housing section 204 of the connector body 200. (See FIG. 6). The space 230 allows the legs 116 of the lock cover 100 to move to the latched position as shown in FIGS. 6 and 7D. By the verifier's 110 movement, the quick connector coupling 10 is verified that the male member 30 is securely and fully inserted into the connector body 200 of the quick connector assembly 20.

Furthermore, as shown in FIG. 7D, when the lock cover 100 also moves to the latched position from the unlatched position, the sound checkers 112 of the lock cover 100 move along the engaged second slots 222 of the connector body 200, and pass over the protruded darts 226 inside the second slots 222. By passing over the darts 226 inside the second slots 222, the sound checkers 112 make a click sound and confirm the lock cover 100 securely to move to the latched position from the unlatched position by the click sound.

Referring back to FIGS. 1A and 1B, in the latched position of the lock cover 100, the second circular opening 122 of the lock cover 100 is placed around the tubular outer surface 36 of the fully inserted male member 30. As described above, the diametric size of the second circular opening 122 is well fit to the tubular outer surface 36 of the male member 30 with clearance because the diameter D2 of the tubular outer surface 36 of the male member 30 is slightly less than the diameter of the second circular opening 122. However, since the diameter D1 of the annular bead 32 of the male member 30 is greater than the diameter of the second circular opening 122, the annular bead 32 of the male member 30 cannot be passed through the second circular opening 122 of the lock cover 100. Accordingly, the quick connector coupling 10 may be doubly locked by the first and second circular openings 120, 122 of the lock cover 100.

As shown in FIG. 1A, in the latched position of the lock cover 100, the assembled configuration such as the first and second circular openings 120, 122 of the lock cover 100 in addition to the engaged latching edges 118 of the lock cover 100 with the housing section 204 of the connector body 200 prevents the fully inserted male member 30 from being pulled-off by a sudden impact. Therefore, the risk of disassemble of the quick connector coupling 10 by the sudden impact can be reduced because the lock cover 100 covers or encloses the housing section 204 of the connector body 200 and increases the pull-off force for the male member 30 in the latched position of the lock cover 100.

Figure 8:
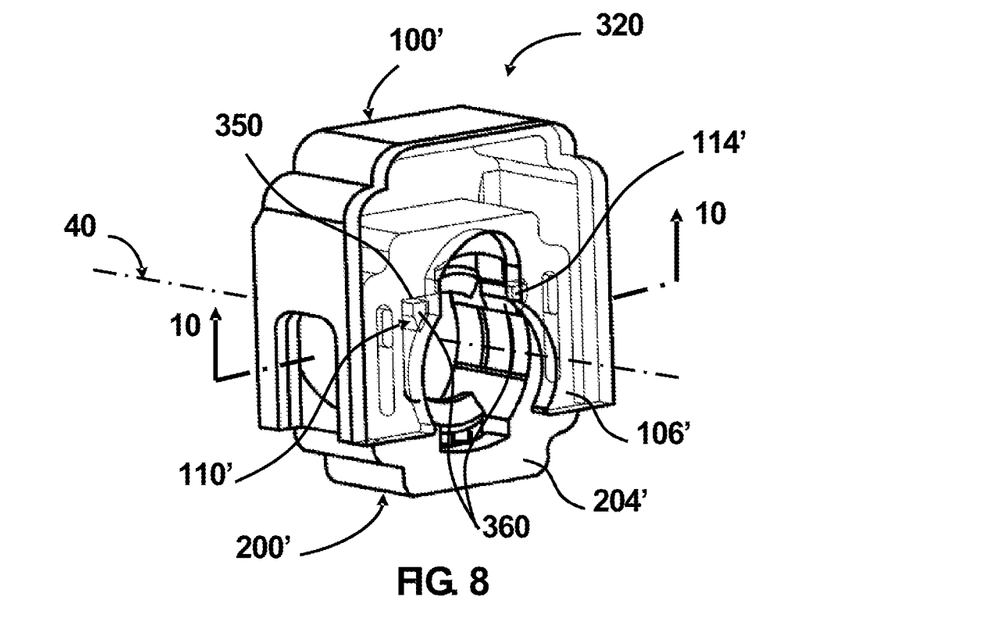
FIG. 8 shows a perspective view of a quick connector assembly in accordance with other form of the present disclosure.
Figure 9:
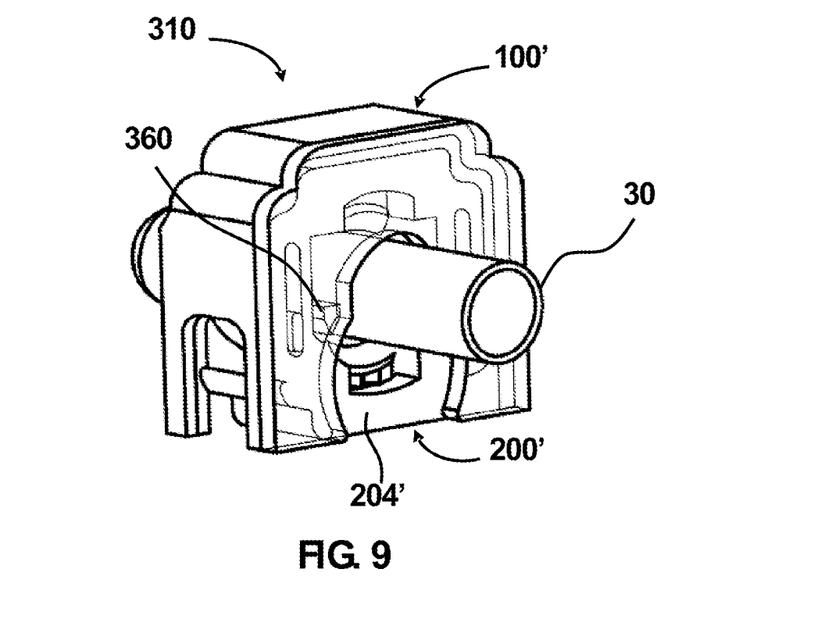
FIG. 9 is a perspective view of the quick connector coupling in accordance with other form of the present disclosure.

In accordance with other aspects of the present disclosure, a modified form of a quick connector assembly 320 is illustrated in FIGS. 8-10. Similar to the quick connector assembly 20, the alternative quick connector assembly 320 is pre-assembled with a connector body 200' and a lock cover 100'. Accordingly, a quick connector coupling 310 comprises of the alternative quick connector assembly 320 and a male member 30 secured by the quick connector assembly 320.

As shown in FIGS. 8-10, generally the connector body 200' of the quick connector assembly 320 is similar to the connector body 200 of the quick connector assembly 20 with the exception that the connector body 200' includes a pair of receivers 350 instead of the first slots 220 of the connector body 200. The same areas as in the quick connector assembly 20 are identified with the same reference numerals, and explanation thereof is omitted. The receivers 350 are formed on the housing section 204' of the connector body 200' and generally defines L-shape. The L-shape receivers 350 couple with a verifier 110' of the lock cover 100'.

The lock cover 100' of the quick connector assembly 320 is similar to the lock cover 100 of the quick connector assembly 20 with the exception of the different verifier shape. As shown in FIG. 8, the verifier 110' has a verifier body 114' including a pair of elongated, generally parallel beam members 360. The beam members 360 are extended transversely from the male member reception end side 106' along the central axis 40. An axial length of the beam members 360 is approximately equal to or slightly less (to allow clearance) than an axial length of the receivers 350 of the connector body 200'. Accordingly, the beam members 360 of the lock cover 100' may be well fit to the receivers 350 of the connector body 200'. In a pre-assembled configuration of the quick connector coupling 310 as shown in FIG. 8, when the lock cover 100' is engaged with the connector body 200', the beam members 360 are securely placed into the receivers 350 of the connector body 200'.

As shown in FIG. 9, a connecting process of the quick connector coupling 310 is similar to the connecting steps of the quick connector coupling 10 as described in FIGS. 7A-7D. According to another aspect of the present disclosure, the beam members 360 of the lock cover 100' are used as the verifier 110' instead of the legs 116 in the quick connector coupling 10. Accordingly, the quick connector coupling 310 is verified that the male member 30 is securely and fully inserted into the connector body 200' of the quick connector assembly 320 when the beam members 360 of the lock cover 100' move to the space 230 (see FIG. 6) of the housing section 204' so that the lock cover 100' moves to the latched position.

The foregoing description of various forms of the invention has been presented for purposes of illustration and description. It is not intended to be exhaustive or to limit the invention to the precis forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A quick connector for making a severable connection in a fluid line comprising:
    a connector body defining a through bore extending from a male member reception end to a tube connection end along a longitudinal axis, the through bore sized to receive a male member generally having a tubular shape sized to extend into the male member reception end, the male member having an annular bead, the annular bead having a diameter greater than a diameter of a tubular outer surface of the male member, the connector body having a bead checker that is integrally formed with the connector body as a single unit and is sized and position to be laterally moved outwardly from the longitudinal axis by the annular bead of the male member; and
    a lock cover releasably securing the male member within the connector body and including a verifier, the lock cover moving between a latched position and an unlatched position,
    wherein the verifier has a verifier body extending from an internal surface of the lock cover and allows the lock cover to move to the latched position only if the verifier body is not contacted to the bead checker of the connector body or the annular bead of the male member.

2. The quick connector according to claim 1, wherein the bead checker includes a pair of generally parallel fingers extending from the connector body towards the male member reception end.

3. The quick connector according to claim 2, wherein the fingers are configured for blocking the verifier body of the lock cover from moving to the latched position of the lock cover when the lock cover is coupled with the connector body without installing the male member.

4. The quick connector according to claim 2, wherein the fingers are biased towards a blocking position, and wherein, in an assembled configuration with the male member, the fingers are resiliently pushed away from the longitudinal axis of the through bore by the annular bead of the male member secured in the connector body for allowing the verifier body of the lock cover to move to the latched position.

5. The quick connector according to claim 1, wherein the connector body engages with a retainer for securing the male member to the connector body in the assembled configuration.

6. The quick connector according to claim 5, wherein the retainer has a pair of retainer tabs and each of the retainer tabs comprises an angled guide surface that is configured for allowing the retainer tabs to be resiliently pushed away from the longitudinal axis of the through bore by contacting with the annular bead of the male member when the male member is inserted into the through bore of the connector body in the assembled configuration.

7. The quick connector according to claim 1, wherein the lock cover further includes an upper side, opposing lateral sides, a male member reception end side and an opening side, wherein the upper side and the lateral sides are parallel to the longitudinal axis, and the male member reception end side and the opening side are perpendicular to the longitudinal axis, and wherein the opening side is faced to the male member reception end side.

8. The quick connector according to claim 7, wherein the verifier body includes at least a leg that is transversely extended from an internal surface of the upper side, and is unitarily formed as a single piece on the male member reception end side.

9. The quick connector according to claim 1, wherein the verifier body includes at least a beam member that is transversely extended from an internal surface of the male member reception end side towards the through bore along the longitudinal axis.

10. The quick connector according to claim 1, wherein the lock cover further comprises at least a sound checker that is transversely extended from the internal surface of the male member reception end side towards the through bore along the longitudinal axis, and is configured to make a click sound only if the lock cover moves to the latched position.

11. The quick connector according to claim 10, wherein the connector body further includes at least a slot that is configured for receiving the sound checker of the lock cover and has a protruded dart for allowing the sound checker of the lock cover to make the click sound only if the lock cover moves to the latched position.

12. The quick connector according to claim 1, wherein the verifier of the lock cover is placed between the bead checker and the tubular outside surface of the male member in the latched position of the lock cover.

13. The quick connector according to claim 1, wherein the male member reception end side has a first generally circular opening and a second generally circular opening, and wherein a diametric size of the first circular opening is larger than a diameter of the annular bead of the male member for allowing the annular bead of the male member to axially move into the connector body in the unlatched position of the lock cover along the longitudinal axis, and a diametric size of the second circular opening is smaller than the annular bead of the male member for preventing the retained male member from pulling-off in the latched position of the lock cover.

14. The quick connector according to claim 1, wherein the lock cover is made of a plastic material.

15. A quick connector to be coupled together with a tubular male member which is provided with an annular bead for making a severable connection in a fluid line, the quick connector comprising:
    a connector body defining a through bore and a longitudinal axis;
    a retainer engaging with the connector body, the retainer configured to secure the annular bead of the male member when inserted into the through bore of the connector body;
    a pair of bead checkers extending from the connector body, the bead checkers operable between a blocking position and a non-blocking position, the annular bead of the male member moving the bead checkers away from the longitudinal axis during transition from the blocking position to the non-blocking position, and the annular bead is secured into the connector body by the retainer;

a lock cover releasably coupling with the connector body in an unlatched position, the lock cover moving between the unlatched position and a latched position; and a verifier being unitarily formed as a single piece with the lock cover, the verifier having a verifier body transversely extended from an internal surface of the lock cover for allowing the lock cover to move to the latched position only if the verifier body is not contacted to the bead checkers of the connector body or the annular bead of the male member.

16. The quick connector according to claim 15, wherein the bead checkers are biased towards the blocking position.

17. The quick connector according to claim 15, wherein the verifier is integrated into the quick connector so that it cannot be removed or lost.

\* \* \* \* \*